(12) United States Patent
Cronie et al.

(10) Patent No.: US 10,433,114 B2
(45) Date of Patent: Oct. 1, 2019

(54) SYSTEM, DEVICE AND METHODS FOR TRANSMITTING AND RECEIVING LOCATION DEPENDENT DATA

(71) Applicant: Koninklijke KPN N.V., Rotterdam (NL)

(72) Inventors: Harm Cronie, Echallens (CH); Julian Nolan, Pully (CH); Matthew Lawrenson, Bussigny (CH)

(73) Assignee: Koninklijke KPN N.V., Rotterdam (NL)

( * ) Notice: Subject to any disclaimer, the term of this patent is extended or adjusted under 35 U.S.C. 154(b) by 0 days.

(21) Appl. No.: 16/063,579

(22) PCT Filed: Dec. 22, 2016

(86) PCT No.: PCT/EP2016/082341
§ 371 (c)(1),
(2) Date: Jun. 18, 2018

(87) PCT Pub. No.: WO2017/109050
PCT Pub. Date: Jun. 29, 2017

(65) Prior Publication Data
US 2018/0376291 A1     Dec. 27, 2018

(30) Foreign Application Priority Data
Dec. 23, 2015 (EP) .................. 15202465

(51) Int. Cl.
*H04W 24/00* (2009.01)
*H04W 4/029* (2018.01)
(Continued)

(52) U.S. Cl.
CPC .......... *H04W 4/029* (2018.02); *H04B 7/0617* (2013.01); *H04W 4/021* (2013.01);
(Continued)

(58) Field of Classification Search
CPC .......... H04W 4/029; H04B 7/02; H04B 7/022; H04B 7/024; H04B 7/026; H04B 7/0408;
(Continued)

(56) References Cited

U.S. PATENT DOCUMENTS 5,699,255 A    12/1997 Ellis et al.
6,243,030 B1 *  6/2001 Levine ............... G01C 21/3647
                                                        340/990
(Continued)

OTHER PUBLICATIONS

PCT Search Report and Written Opinion, PCT International Application No. PCT/EP2016/082341, dated Mar. 8, 2017, 11 pages.
(Continued)

*Primary Examiner* — Huy C Ho
(74) *Attorney, Agent, or Firm* — McDonnell Boehnen Hulbert & Berghoff LLP (57) ABSTRACT

The invention relates to a system (1) for transmitting location dependent data. The system comprises multiple antennas (3), a transmitter (5) coupled to the multiple antennas (3) and a processor (7). The processor (7) is configured to determine multiple location dependent parts of the location dependent data, each of the multiple location dependent parts corresponding to a different geographical region (8*a-g*, 25), and to use the transmitter (5) to transmit at least two of the multiple location dependent parts to a different target location (9*a-g*, 23) over the multiple antennas (3). Each of the at least two location dependent parts is associated with a different reference location (9*a-g*, 21) and the distance between a target location (9*a-g*, 23) and a reference location (9*a-g*, 21) associated with a location dependent part transmitted to the target location (9*a-g*, 23) is smaller than a predetermined threshold. The invention further relates to a device (17) for receiving location dependent data. The device (17) comprises a receiver and a processor. The processor is configured to use the receiver to receive a
(Continued)

broadcast data stream comprising a first location dependent part of the location dependent data and a first identifier identifying the first location dependent part at a previous instance and a second location dependent part of the location dependent data and a second identifier identifying the second location dependent part at a current instance. The processor is further configured to detect a difference between the first identifier and the second identifier and to disregard the first location dependent part when the difference is detected. The invention further relates to the methods performed by the system and the device and a computer program product enabling a computer system to perform any of these methods.

17 Claims, 5 Drawing Sheets

(51) Int. Cl.
| | |
|---|---|
| *H04W 4/021* | (2018.01) |
| *H04W 4/02* | (2018.01) |
| *H04W 4/18* | (2009.01) |
| *H04B 7/06* | (2006.01) |
| *H04W 4/04* | (2009.01) |
| *H04W 4/06* | (2009.01) |

(52) U.S. Cl.
CPC ............. *H04W 4/023* (2013.01); *H04W 4/18* (2013.01); *H04W 4/046* (2013.01); *H04W 4/06* (2013.01)

(58) Field of Classification Search
CPC ... H04B 7/0413; H04B 7/0452; H04B 7/0456
USPC ...................................... 455/456.1
See application file for complete search history.

(56) References Cited

U.S. PATENT DOCUMENTS

| | | |
|---|---|---|
| 8,160,569 B1 | 4/2012 | Vanlaningham et al. |
| 2015/0341749 A1 | 11/2015 | Jodlauk et al. |

OTHER PUBLICATIONS

European Search Report, European Patent Application No. 15202465.9, dated Jun. 2, 2016, 6 pages.
3GPP TS 23.246 V15.0.0, "3rd Generation Partnership Project; Technical Specification Group Services and System Aspects; Multimedia Broadcast/Multicast Service (MBMS); Architecture and Functional Description (Release 15)", Dec. 2017, pp. 1-77.

* cited by examiner

SYSTEM, DEVICE AND METHODS FOR TRANSMITTING AND RECEIVING LOCATION DEPENDENT DATA

CROSS REFERENCE TO RELATED APPLICATIONS

The present application is a national stage entry of, and claims priority to, PCT/EP2016/082341, filed on Dec. 22, 2016, which claims priority to European Patent Application EP 15202465.9, filed in the European Patent Office on Dec. 23, 2015, both of which are hereby incorporated in their entirety herein by reference.

FIELD OF THE INVENTION

The invention relates to a system for transmitting location dependent data and a device for receiving location dependent data.

The invention further relates to a method of transmitting location dependent data and a method of receiving location dependent data.

The invention also relates to a computer program product enabling a computer system to perform any of such methods, a computer-implemented data format for formatting data transmitted by such a system and a computer-implemented data structure for storing data used by such a system.

BACKGROUND OF THE INVENTION

U.S. Pat. No. 5,699,255 discloses an apparatus and method for providing map information of varying resolution to a navigation device. In one embodiment, a position determining system is attached to the navigation device. The position information is transmitted to a base station containing map information. Map information related to the location of the navigation device is then transmitted from the base station to the navigation device using a bidirectional communication link. The base station only transmits map information related to the position information of the navigation device.

A drawback of this method is that it uses a substantial amount of resources if a substantial amount of navigation devices is present, as these would all require a dedicated data stream from and/or to a base station.

SUMMARY OF THE INVENTION

As will be appreciated by one skilled in the art, aspects of the present invention may be embodied as a system, a device, a method or a computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is a first object of the invention to provide a system for transmitting location dependent data, which uses resources efficiently even when a large number of receivers is present.

It is a second object of the invention to provide a device for receiving location dependent data, which uses resources efficiently even when a large number of receivers is present.

It is a third object of the invention to provide a method of transmitting location dependent data, which uses resources efficiently even when a large number of receivers is present.

It is a fourth object of the invention to provide a method of receiving location dependent data, which uses resources efficiently even when a large number of receivers is present.

According to the invention, the first object is realized in that the system for transmitting location dependent data comprises a plurality of antennas, a transmitter coupled to said plurality of antennas, and a processor configured to determine a plurality of location dependent parts of said location dependent data, each of said plurality of location dependent parts corresponding to a different geographical region, and to use said transmitter to transmit, e.g. using broadcast/multi-target transmissions, at least two, e.g. each, of said plurality of location dependent parts to a different target location over said plurality of antennas, e.g. using beamforming, wherein each of said at least two of said plurality of location dependent parts is associated with a different reference location and the distance between a target location and a reference location associated with a location dependent part transmitted to said target location is smaller than a predetermined threshold. The system may be located at a single site or distributed across several sites. The size of a geographical region and the threshold for that geographical region are preferably chosen such that all receivers in that geographical region can receive the transmission of the location dependent part for that geographical region.

The target location is typically the location where the transmission beam is received strongest in the geographical region. The target location is a center or centroid of a target area. The target area is determined by at least the target location and the width of the transmission beam. The target location may be the center or centroid of the geographical region, but this is not required.

The reference location is preferably located within the geographical region. The reference location is typically the ideal location of a reference device used to determine channel characteristics for (transmitting to) a geographical region. A geographical region may change during operation, e.g. when the system is located on a moving object like a plane or a train. In this case, the geographical region is fixed relative to the system, but its (absolute) geographical coordinates change. A geographical region may also change relative to the system. For example, a geographical region may be associated with the end of a queue or of a traffic jam and this end may be dynamically detected. When the geographical region changes, the reference location changes accordingly.

The system may transmit to stationary receivers at reference locations and/or mobile receivers. A receiver can be comprised in, for example, a vehicle, e.g. a car or a truck. A receiver device may be a personal device, for example, but may also be provided by a vehicle producer or a vehicle owning company, for example. A receiver device may have a user interface, but may also employ only machine-to-machine communication. Receiver devices may be robots, actuators, advertising displays, information panels, locks or lights, for example.

The system of the invention only transmits location dependent parts once per (substantially non-overlapping) geographical region, which results in a much more efficient use of resources when a large numbers of receivers is present in a geographical region. A location dependent part is transmitted to a target location in the geographical region that can be received by all receivers in this geographical region. The location dependent part may relate to/cover a larger geographical area than the geographical area in which the location dependent part can be received. This may be beneficial for devices moving from one geographical region to another.

The system of the invention provides a more scalable solution than a system that broadcasts a data stream containing location dependent data for an entire sector, from which each receiver needs to extract the location dependent part related to the location of the receiver. In the latter system, the data rate might need to be very high in large and/or dense sectors, e.g. in a sector with a high density of points of interest or a high density of receivers, or a maximum data rate might limit the amount of location dependent data that can be transmitted.

The location dependent parts are preferably transmitted over a broadcast channel. The system may use eMBMS (evolved Multimedia Broadcast/Multicast Service) in accordance with 3GPP TS 23.246 to announce which broadcast channel(s) it is using for this purpose.

Said processor may be configured to use said transmitter to transmit each of said plurality of location dependent parts to a different target location over said plurality of antennas over the same radio channel, i.e. in the same frequency range. This takes up less resources.

Said processor may be configured to use said transmitter to transmit said at least two of said plurality of location dependent parts to a different target location over said plurality of antennas using multipath propagation. By transmitting the location dependent parts to a reference location or a target location near a reference location using multipath propagation instead of in pre-defined directions, location dependent parts can be targeted towards locations that are not in a line-of-sight path of the antennas and different location dependent parts can be transmitted to different target locations in the same line-of-sight path of the antennas.

Said processor may be configured to use said transmitter to transmit said plurality of location dependent parts to stationary receivers at said reference locations. In order to transmit a location dependent part to a certain target location over the plurality of antennas, e.g. using multi-user MIMO, the channel characteristics, e.g. a channel matrix, need to be estimated. Since a single transmission should be receivable by a plurality of user receivers, the transmission should not be targeted towards a single one of the plurality of user receivers. By using stationary receivers at reference locations, the channel characteristics can be estimated by using pilots sent by these stationary receivers, which can be placed at central locations in the geographical regions. In effect, said distance between said target location and said reference location associated with said location dependent part transmitted to said target location may be very small or zero. This does not have an impact on the width of the transmission beam.

Said processor may be configured to configure the directivity of at least one of said transmitter and said plurality of antennas based on said reference location associated with said location dependent part and a location of a receiver located near said reference location in order to transmit said location dependent part to said target location. If it is not possible or desirable to use stationary receivers, channel characteristics can be estimated from transmissions by the user receivers (which may use only machine-to-machine communication). However, transmissions should not be targeted completely towards one or more user receivers near the edges of a geographical region, i.e. relatively far away from the reference locations, to prevent that new user receivers that enter the geographical region at another edge of the geographical region cannot receive transmissions from the system.

For example, user receivers may send pilots to allow the system to estimate the channel characteristics. User receivers may send a pilot to the system upon receiving a certain broadcast signal from the system. The system may request pilots when the system initiates and/or may use (only) pilots received within a certain time period. This certain time period may depend on the geographical region. For example, when the amount of receivers and/or physical objects in a certain geographical region changes every day, e.g. due to events that take place in this geographical region, this certain time period may be a single day. Each day, the estimated channel characteristics may be reset to default channel characteristics for that geographical region, for example. User receivers may transmit their geographical, e.g. GPS, location to the system to improve the estimation of the channel characteristics. The certain time period may be short. The system may only request and/or use pilots in a measurement mode. In this measurement mode, the channel characteristics and/or the transmitter/receiver/antenna parameters determined from the channel characteristics are stored in a memory, e.g. a memory that is part of the processor or of the system, and then later used by the system during normal operation. The measurement mode may be invoked manually or automatically when the environment changes significantly.

Said plurality of antennas may comprise N antennas, said plurality of location dependent parts may comprise K location dependent parts, said target locations may comprise K target locations and N may be at least equal to K. When N is at least equal to K, transmissions can be directed towards target locations most effectively.

When signals transmitted over said N antennas are represented by a vector $\underline{x}$, signals received at said K target locations are represented by a vector $\underline{y}$ and said vector $\underline{y}$ is approximated by multiplying a K×N channel matrix H with said vector $\underline{x}$, said K×N channel matrix H preferably has a rank of K. Channel matrices are used in MIMO systems to estimate channel characteristics. In certain prior art systems, K might represent the number of antennas used by the receiver when a single transmitter uses an antenna array to transmit signals and a single receiver uses an antenna array to receive these signals. However, in this case, K represents the number of location dependent parts and target locations and channel matrix H represents the channel from the transmitter of the system to the receivers of the plurality of target locations. When K×N channel matrix H has a rank of K, transmissions can be directed towards target locations most effectively.

N may be larger than K. This makes it easier to ensure that the signals received at a receiver are sufficiently independent from the signals received at another receiver, e.g. that K×N channel matrix H has a rank of K. K may be 10 to 50, for example. For a massive MIMO array, N may be in the order of several tens to hundreds, for example, e.g. 16, 20, 100 or between 20 and 40.

At least one of said processor and said transmitter may be configured to generate values for transmission over said N antennas, which can be represented by said vector $\underline{x}$, by performing at least one multiplication that is equal or similar to multiplying a column vector comprising said K location dependent parts with a N×K matrix P, said K×N channel matrix H multiplied with said N×K matrix P equaling the identity matrix. When a K×N channel matrix H is used that has a rank of K, H times P equals the identity matrix. This matrix P can be used to determine the signals to be transmitted over each of the N antennas. Matrix P may be the Moore-Penrose pseudo-inverse of H, for example.

Said system may further comprise data storage configured to store said plurality of location dependent parts and information associating each of said plurality of location dependent parts with a different reference location, wherein said processor may be configured to determine a target location for each of said location dependent parts based on said reference location associated with said each of said location dependent parts and configured to obtain said plurality of location dependent parts from said data storage. The reference locations may be predetermined so that knowledge about the environment and/or density of user receivers in the different geographical regions can be taken into account. For example, the data storage may comprise a 3D map and a list of geographical areas, e.g. the geographical coordinates of the top-right and bottom-left corners of a geographical area if it is a rectangular area, and their associated reference location in the geographical area. The geographical areas may be smaller for exhibition halls, shopping malls and highways near big cities than for rural areas, for example.

Said processor may be further configured to use said transmitter to transmit at least one of an identifier of said location dependent part and an identifier of said reference location associated with said location dependent part along with said location dependent part to said target location. Either or both identifiers may comprise geographical coordinates. The identifier of the location dependent part can be used by receivers to determine whether they are receiving data belonging to the same location dependent part as before. The identifier of the reference location can be used by receivers to correct the received location dependent part based on a difference between a receiver location and the reference location. The identifiers are preferably at least locally unique and may be globally unique, for example.

According to the invention, the second object is realized in that the device for receiving location dependent data comprises a receiver and a processor configured to use said receiver to receive a broadcast data stream comprising a first location dependent part of said location dependent data and a first identifier identifying said first location dependent part at a previous instance and a second location dependent part of said location dependent data and a second identifier identifying said second location dependent part at a current instance, to detect a difference between said first identifier and said second identifier and to disregard said first location dependent part when said difference is detected. In this way, the device does not combine two different location dependent parts, which would result in incorrect information being provided to a user.

Said processor may further be configured to determine a geographical location of said device, to use said receiver to receive an identifier of a location associated with said second location dependent part in said broadcast data stream and to correct said second location dependent part based on a difference between said determined geographical location of said device and said location associated with said second location dependent part. In this way, a location dependent part that comprises information, e.g. distances and/or directions, in which the reference location serves as a reference point can be corrected so that the location of the device serves as a reference point.

According to the invention, the third object is realized in that the method of transmitting location dependent data comprises the steps of determining a plurality of location dependent parts of said location dependent data, each of said plurality of location dependent parts corresponding to a different geographical region, and using a transmitter to transmit at least two, e.g. each, of said plurality of location dependent parts to a different target location over a plurality of antennas, wherein each of said at least two of said plurality of location dependent parts is associated with a different reference location and the distance between a target location and a reference location associated with a location dependent part transmitted to said target location is smaller than a predetermined threshold. Said method may be performed by software running on a programmable device. This software may be provided as a computer program product.

The step of using a transmitter to transmit each of said plurality of location dependent parts to a different target location over a plurality of antennas may comprise using said transmitter to transmit each of said plurality of location dependent parts to a different target location over said plurality of antennas over the same radio channel.

The step of using a transmitter to transmit at least two of said plurality of location dependent parts to a different target location over a plurality of antennas may comprise using said transmitter to transmit at least two of said plurality of location dependent parts to a different target location over said plurality of antennas using multipath propagation.

The step of using a transmitter to transmit each of said plurality of location dependent parts to a different target location may comprise using said transmitter to transmit said plurality of location dependent parts to stationary receivers at said reference locations.

Said method of transmitting location dependent data may further comprise the step of configuring the directivity of at least one of said transmitter and said plurality of antennas based on said reference location associated with said location dependent part and a location of a receiver located near said reference location in order to transmit said location dependent part to said target location.

Said method of transmitting location dependent data may further comprise the steps of obtaining information associating each of said plurality of location dependent parts with a different reference location from a data storage, determining a target location for each of said location dependent parts based on said reference location associated with said each of said location dependent parts and obtaining said plurality of location dependent parts from said data storage.

Said method of transmitting location dependent data may further comprise the step of using said transmitter to transmit at least one of an identifier of said location dependent part and an identifier of said reference location associated with said location dependent part along with said location dependent part to said target location.

According to the invention, the fourth object is realized in that the method of receiving location dependent data comprises the steps of using a receiver to receive a broadcast data stream comprising a first location dependent part of said location dependent data and a first identifier identifying said first location dependent part at a previous instance and a second location dependent part of said location dependent data and a second identifier identifying said second location dependent part at a current instance, detecting a difference between said first identifier and said second identifier, and disregarding said first location dependent part when said difference is detected. Said method may be performed by software running on a programmable device. This software may be provided as a computer program product.

Said method of receiving location dependent data may further comprise determining a geographical location of a device comprising said receiver, using said receiver to receive an identifier of a location associated with said second location dependent part in said broadcast data stream and correcting said second location dependent part based on a difference between said determined geographical location of said device and said location associated with said second location dependent part.

In another aspect of the invention, the system for transmitting location dependent data comprises a plurality of antennas, a transmitter coupled to said plurality of antennas, and a processor configured to determine a plurality of location dependent parts of said location dependent data, each of said plurality of location dependent parts corresponding to a different geographical region, and, for each of said plurality of location dependent parts, to use said transmitter to transmit, preferably broadcast, a location dependent part to a target location in a geographical region which corresponds to said location dependent part over said plurality of antennas using beamforming.

In a further aspect, the method of transmitting location dependent data comprises the steps of determining a plurality of location dependent parts of said location dependent data, each of said plurality of location dependent parts corresponding to a different geographical region, and, for each of said plurality of location dependent parts, to use a transmitter to transmit, preferably broadcast, a location dependent part to a target location in a geographical region which corresponds to said location dependent part over said plurality of antennas using beamforming.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations comprising: determining a plurality of location dependent parts of location dependent data, each of said plurality of location dependent parts corresponding to a different geographical region, and using a transmitter to transmit each of said plurality of location dependent parts to a different target location over a plurality of antennas, wherein each of said plurality of location dependent parts is associated with a different reference location and the distance between a target location and a reference location associated with a location dependent part transmitted to said target location is smaller than a predetermined threshold.

The same or a different non-transitory computer-readable storage medium stores at least one software code portion, the software code portion, when executed or processed by a computer, being configured to perform executable operations comprising: using a receiver to receive a broadcast data stream comprising a first location dependent part of location dependent data and a first identifier identifying said first location dependent part at a previous instance and a second location dependent part of said location dependent data and a second identifier identifying said second location dependent part at a current instance, detecting a difference between said first identifier and said second identifier, and disregarding said first location dependent part when said difference is detected.

In another aspect of the invention, a computer-implemented data format comprises a location dependent part and at least one of an identifier of said location dependent part and an identifier of a reference location associated with said location dependent part, wherein said reference location is used to determine a target location to which said location dependent part is transmitted.

In a further aspect of the invention, a computer-implemented data structure comprises a plurality of location dependent parts and information associating each of said plurality of location dependent parts with a different location, wherein a target location to which a specific one of said location dependent parts is transmitted is based on a location associated with said specific one of said location dependent parts.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
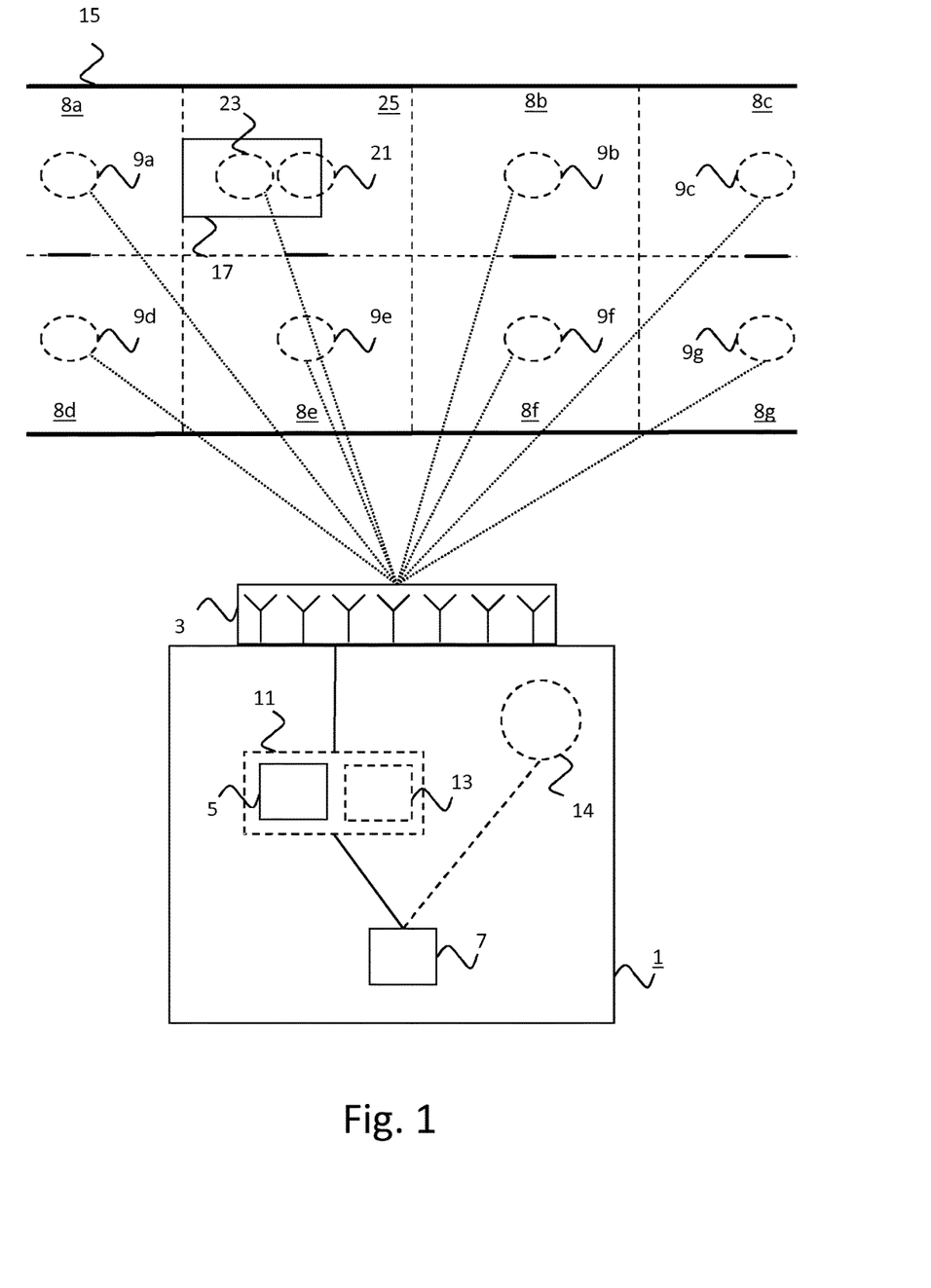
FIG. 1 is a block diagram of the system of the invention.

The system 1 of the invention comprises an array of antennas 3, a transmitter 5 coupled to the array of antennas 3 and a processor 7, see FIG. 1. The processor 7 is configured to determine a plurality of location dependent parts, comprising parts of location dependent data, each of the plurality of location dependent parts corresponding to a different geographical region, and to use the transmitter 5 to transmit/broadcast at least two, e.g. each, of the plurality of location dependent parts to a different target location over the array of antennas 3. Each of the at least two of the plurality of location dependent parts is associated with a different reference location and the distance between a target location and a reference location associated with a location dependent part transmitted to the target location is smaller than a predetermined threshold. The system 1 may be a base station, for example. The system 1 may comprise one device or multiple devices. The transmitter 5 may be UMTS, LTE or CDMA compliant, for example. Determining a plurality of location dependent parts may comprise splitting a large map into these parts or obtaining these parts already separated from data storage, for example. Other parts than the at least two of the plurality of parts may be transmitted using conventional techniques, for example.

The location dependent parts may be parts of a (2D or 3D) map, for example. A location dependent part corresponding to a geographical region may only relate to this geographical region or it may cover a larger area. The predetermined threshold is preferably determined such that all receiver devices in a certain geographical region can receive the location dependent part corresponding to that geographical region. Geographical regions are not necessarily adjacent. In an embodiment, no location dependent parts are transmitted when they correspond to geographical regions in which no or few receiver devices are expected to be in.

FIG. 1 shows eight adjacent geographical regions 8a-g and 25 on a road 15. A single device 17, e.g. a car, is present in geographical region 25 on road 15. No devices are present in geographical regions 8a-g. In these geographical regions 8a-g, the target locations to which the location dependent parts are transmitted are the same as the reference locations 9a-g corresponding to the geographical locations 8a-g. This means that reception is not optimal when a car just entered one of these geographical regions 8a-g, but sufficient to receive the corresponding location dependent part.

In an embodiment, the processor 7 is configured to configure the directivity of at least one of the transmitter 5 and the plurality of antennas 3 based on the reference location, e.g. reference location 21, associated with the location dependent part and a location of a receiver located near the reference location, e.g. a receiver in device/car 17, in order to transmit the location dependent part to the target location, e.g. target location 23. This embodiment is illustrated in FIG. 1. In geographical region 25, the target location 23 is different than the reference location 21. This might be due to the system 1 estimating a channel matrix based on an uplink pilot sent by device/car 17, for example. As a result, reception at device/car 17 is better than when reference location 21 would have been used as target location. However, when device/car 17 drives further towards geographical region 8a, the target location 23 should not move (much) further towards geographical region 8a to prevent that a car entering geographical region 25 from geographical region 8b would not be able receive the location dependent part corresponding to geographical region 25.

In the example described in the previous paragraph, the target location 23 has been determined based on one receiver device, i.e. device/car 17. However, the target location 23 may also be determined based on (e.g. uplink pilots from) multiple receiver devices. After a certain amount of time, the target location 23 may revert to being equal to the reference location 21. This certain amount of time may depend on the environment, for example. If the environment is an exhibition center, locations of receiver devices (where optimal reception has most benefit) may depend on the exhibition currently taking place.

Figure 2:
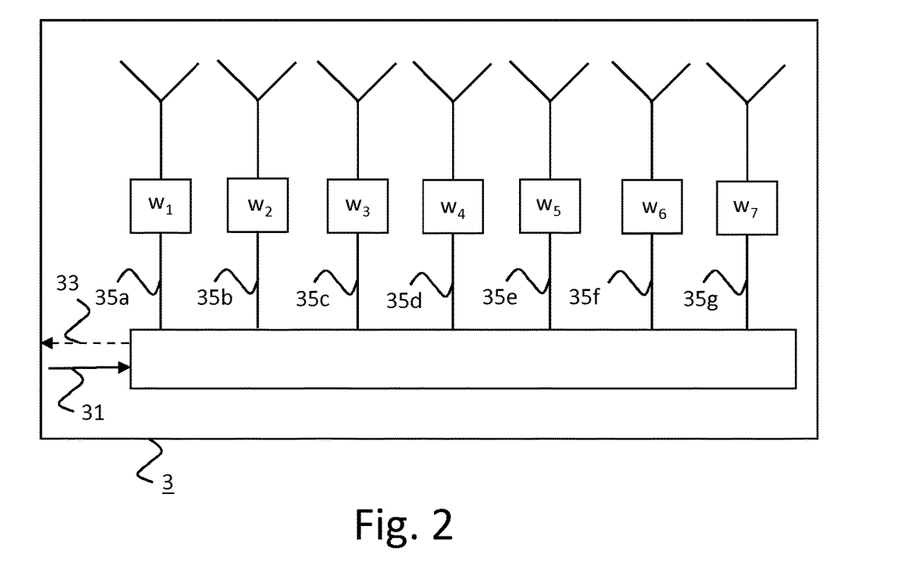
FIG. 2 is a block diagram of an array of antennas used in an embodiment of the system.

In an embodiment, the processor 7 is configured to use the transmitter 5 to transmit each of the plurality of location dependent parts to a different target location over the array of antennas 3 using multipath propagation. In the embodiment shown in FIG. 2, the array of antennas 3 comprises seven antennas 35a-g. The antennas 35a-g of the antenna array 3 may be arranged in a linear configuration, a rectangular configuration, or a circular configuration, for example. Alternatively, the antenna array elements 35a-g may be arranged in a three-dimensional configuration, for example. Another option is that the antenna elements are distributed across several sites, making the system 1 effectively a distributed base station.

The processor 7 is configured to configure the individual antennas 35a-g of antenna array 3 for transmission, e.g. by setting the amplitude and phase of the signals for each of the elements 35a-g of the antenna array 3. The spacing between the antenna array elements 35a-g may be in the order of the wavelength of the electromagnetic waves used for communication, for example. Although the embodiment of the antenna array 3 shown in FIG. 2 comprises seven antennas 35a-g, the antenna array 3 could alternatively comprise more or fewer antennas.

In an embodiment, the processor 7 is configured to use the transmitter 5 to transmit the plurality of location dependent parts to stationary receivers at the reference locations. When the environment allows the embedding of stationary receivers at reference locations, these stationary receivers may then transmit uplink pilots on a regular basis such that the system can estimate the channel towards these locations with a high level of precision. These embedded devices may themselves also employ a distributed array of antennas An example where such a scenario may be relevant is a highway where vehicles require a real-time 3D map. The highway may be divided into sectors where in each sector a base station delivers a set of location dependent streams that comprise the 3D map relevant for the particular locations. Along the highway or in the road surface itself, devices may be embedded that transmit pilots such that the base station can estimate the channel to the device locations or even to locations close to these devices.

In an embodiment, the plurality of antennas 3 comprises N antennas, the plurality of location dependent parts comprises K location dependent parts, the target locations comprise K target locations and N is at least equal to K. As exemplified in in FIG. 1, the geographical regions may correspond to different parts of a road 15. Users, devices and/or vehicles on this road 15 require data that is dependent on their current location, and the system 1 disseminates this data. Instead of broadcasting all the data or delivering that data to each of the users individually with a point-to-point link, the data is split into a set of location dependent data streams and each data stream is delivered to a reference location in the sector.

In this embodiment, the system 1 is a base station in which the processor 7 acquires the data that may be relevant for the users in the geographical regions from a data source unit. The data source unit may be for instance a LIDAR that creates a real-time 3D map of the environment. Other examples of data source units are a radar, a visual camera, a time-of-flight camera, and a 3D camera based on structured light principles. The processor 7 splits the data from the data source unit into a set of K data streams. This is done in such a way that each data stream comprises data relevant for a particular location in the sector. For instance, when the data source unit is a LIDAR that acquires a 3D map of the environment, the 3D map may be split into K different parts. The base station sends each of the data streams to a location in the sector. For this purpose K locations may be defined in the sector to which each of the data streams is sent. In FIG. 1, an example of K locations is illustrated on the road 15 and denoted by 9a to 9g and 23. To send the K data streams to the K locations in the sector, the processor 7 generates signals for the array of antennas 3.

Signals transmitted over the N antennas can be represented by a vector $\underline{x}$, signals received at the K target locations can be represented by a vector $\underline{y}$ and the vector $\underline{y}$ can be approximated by multiplying a K×N channel matrix H with the vector $\underline{x}$. Preferably, the K×N channel matrix H has a rank of K. Typically, N is larger than K to ensure that the K×N channel matrix H has this rank of K. In an embodiment, at least one of the processor 7 and the transmitter 5 is configured to generate values for transmission over the N antennas, which can be represented by the vector $\underline{x}$, by performing at least one multiplication that is equal or similar to multiplying a column vector comprising the K location dependent parts with a N×K matrix P, where the K×N channel matrix H multiplied with the N×K matrix P equals the identity matrix.

In an embodiment, the system 1 further comprises data storage 14, see FIG. 1, configured to store the plurality of location dependent parts and information associating each of the plurality of location dependent parts with a different reference location, wherein the processor is configured to determine a target location for each of the location dependent parts based on the reference location associated with each of the location dependent parts and configured to obtain the plurality of location dependent parts from the data storage 14. The data storage 14 may comprise, for example, a hard disk, an optical storage device and/or solid state memory. The location dependent parts may be stored as one entity, e.g. as a large map, or as a plurality of entities, e.g. one per geographical region. The location dependent parts may be stored as files or in a database, for example. The information associating location dependent parts with reference locations may be stored as part of this entity/these entities, or may be stored separately. A location dependent part may comprise multiple layers, e.g. a map and points of interest, which may be stored separately. Service providers and retailers may be able to access the system 1 in order to add and/or edit information stored on the data storage 14, e.g. the map or the points of interest.

In the same or in a different embodiment, the processor 7 is further configured to use the transmitter 5 to transmit at least one of an identifier of said location dependent part and an identifier of the reference location associated with the location dependent part along with the location dependent part to the target location. This identifier of the reference location may be the geographical location of the reference location, for example. The identifier of the location dependent part can be used by receiver devices to determine whether they are still receiving location dependent data of the same geographical region, e.g. when moving from one geographical region to another. If a receiving device is starting to receive location dependent data of a different geographical region, it can discard or ignore the previously received information. The identifier of the location dependent part may comprise geographical coordinates or a number assigned by the system, for example.

In an embodiment, at least one of the plurality of location dependent parts is associated with multiple different reference locations and the at least one of the plurality of location dependent parts is transmitted to multiple different target locations in the corresponding geographical regions.

Figure 5:
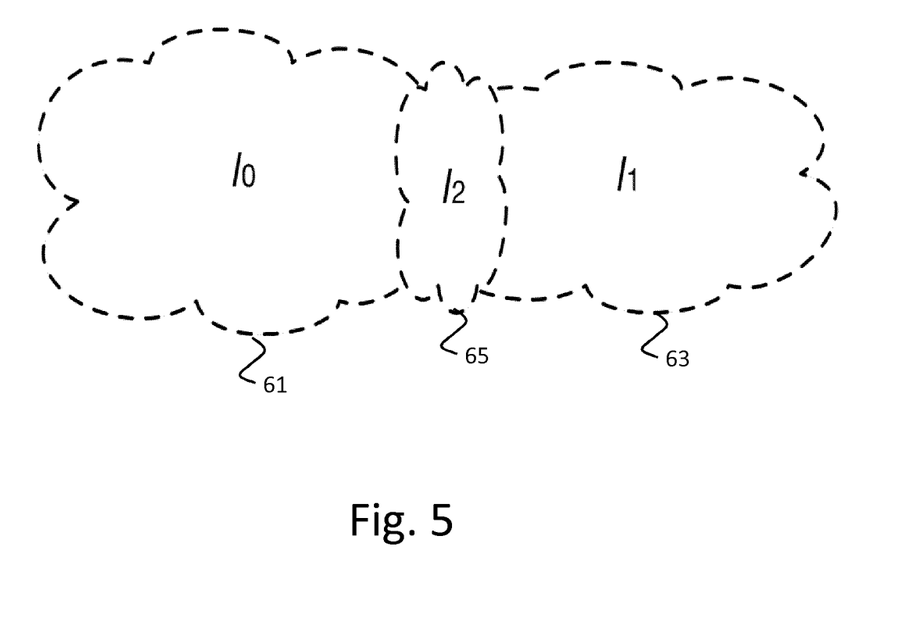
FIG. 5 shows geographical regions illustrating an embodiment of the system of the invention.

In an embodiment, location dependent data streams may be encoded by means of a multi-user technique such as code-division multiple access (CDMA). This facilitates the creation of overlapping geographical regions. A device that moves from one geographical region to another geographical region would then be able to receive multiple location dependent data streams when traversing a boundary between two geographical regions. FIG. 5 shows an example with two geographical regions that are denoted by 61 ($I_0$) and 63 ($I_1$), respectively. In each of these two geographical regions, a location dependent data stream can be received. These two location dependent data streams may be the main data streams and they may be encoded by a particular CDMA spreading code (the main spreading code). FIG. 5 also shows a geographical region that is denoted by 65 ($I_2$). This geographical region 65 partly overlaps with the geographical regions 61 and 63. The location dependent data stream for geographical region 65 may be encoded with a different spreading code (the auxiliary spreading code). In this way, a device would normally receive the data for either geographical region 61 or geographical region 63, but may switch to receive location dependent data for geographical region 65 when traversing the boundary between geographical regions 61 and 63.

Alternatively, time-multiplexing techniques can be used to provide better performance when traversing boundaries between geographical regions. For example, in the center of a geographical region, data relevant to that geographical region may be transmitted 90 percent of the time. The remaining 10 percent of the time, location dependent data of neighboring geographical regions may be transmitted. Towards the edge of the geographical region, the percentage corresponding to the neighboring zones may increase.

Figure 3:
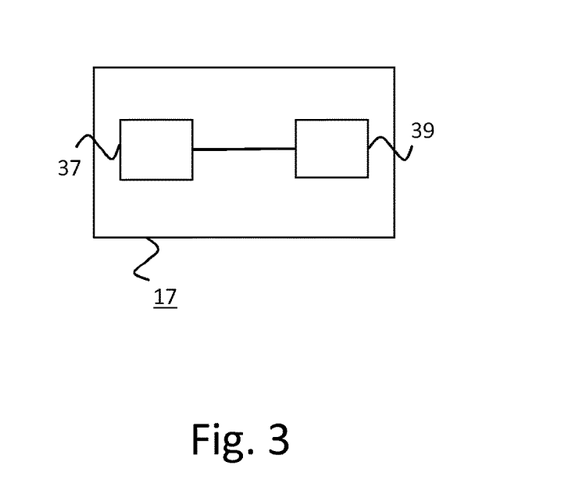
FIG. 3 is a block diagram of an embodiment of the device of the invention.

The device 17 of the invention comprises a receiver 37 and a processor 39, see FIG. 3. The processor 39 is configured to use the receiver 37 to receive a broadcast data stream comprising a first location dependent part of the location dependent data and a first identifier identifying the first location dependent part at a previous instance and a second location dependent part and a second identifier identifying the second location dependent part of the location dependent data at a current instance, to detect a difference between the first identifier and the second identifier and to disregard the first location dependent part when the difference is detected. The device 17 may be a vehicle or part of a vehicle, for example. Alternatively, the device 17 may be mobile device, e.g. a smartphone or a smartwatch, or part of a mobile device, for example. The receiver 37 may be UMTS, LTE or CDMA compliant, for example. The processor 39 may be a general purpose processor, e.g. from Qualcomm or ARM, or an application specific processor, for example. Which broadcast channel(s) the device should use to receive the broadcast data stream may be announced using eMBMS (evolved Multimedia Broadcast/Multicast Service) in accordance with 3GPP TS 23.246, for example.

In an embodiment, the processor 39 is further configured to determine a geographical location of the device, to use the receiver 37 to receive an identifier of a location associated with the second location dependent part in the broadcast data stream and to correct the second location dependent part based on a difference between the determined geographical location of the device and the location associated with the second location dependent part. For example, if the target location is one meter to the right of the reference location, a coordinate of a point of interest may be modified to reflect a position one meter to the left of the original position if the coordinate is relative to the reference location.

In an embodiment, not only the system 1 employs MIMO techniques but also one or more of the devices 17 employ MIMO techniques for the purpose of e.g. achieving receive diversity.

Figure 6:
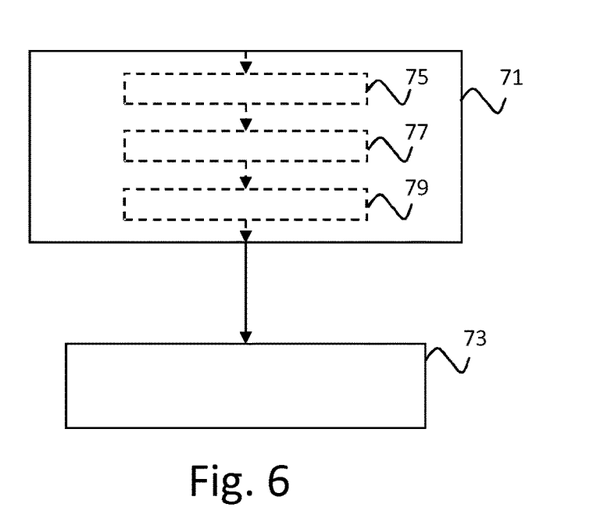
FIG. 6 is a flow diagram of the method of transmitting location dependent data of the invention.

The method of transmitting location dependent data of the invention comprises two steps, see FIG. 6. A step 71 comprises determining a plurality of location dependent parts, each of the plurality of location dependent parts corresponding to a different geographical region. Step 71 may comprise a step 75 of acquiring data that is relevant for the geographical regions of interest. The data may be acquired by for instance a LIDAR, radar, visual camera, or time-of-flight camera. Furthermore, the data may define a real-time 3D map of the sector. Such a 3D map may be useful for vehicles that operate in the sector. Step 71 may further comprise a step 77 of selecting K locations corresponding to the geographical regions of interest. Data that is relevant to selected locations is then delivered to the these locations. The locations may be selected in a regular way by for instance superimposing a rectangular grid on a sector. Step 71 may further comprise a step 79 of splitting the data acquired in step 75 into K data streams where each of the data streams comprises data relevant for one of the K locations. For instance, when in step 75 a 3D map of the sector is acquired with a LIDAR, the ith data stream may contain part of the 3D map that describes the environment of the ith location selected in Step 77.

A step 73 comprises using a transmitter to transmit at least two of the plurality of location dependent parts to a different target location over a plurality of antennas, wherein each of the at least two of the plurality of location dependent parts is associated with a different reference location and the distance between a target location and a reference location associated with a location dependent part transmitted to the target location is smaller than a predetermined threshold. In an embodiment, all K data streams are delivered to the K locations in this step. In an embodiment, step 73 comprises using the transmitter to transmit each of the plurality of location dependent parts to a different target location over the plurality of antennas using multipath propagation. This may be implemented by massive MIMO spatial multiplexing techniques. In the following paragraphs, these massive MIMO spatial multiplexing techniques are described in further detail.

The principles of MIMO and massive MIMO may be described at the abstraction level of the discrete-time communication system. In many wireless communication systems equalization is required to mitigate inter-symbol interference and frequency selective fading. Modulation methods such as orthogonal frequency division multiplexing (OFDM) or single-carrier frequency domain equalization (SC-FDE) may be used to reduce the complexity of equalization.

With OFDM and SC-FDE, the discrete-time communication system may be modeled by a simple linear relation. The input-output relation may be simply written as y=hx, where x is a complex number that is taken from a so-called signal constellation. Information that is transmitted is first mapped to an element of the signal constellation which leads to the symbol x. The received symbol y is a complex number also, and the channel is defined by the complex number h. Equalization reduces to compensating for h. MIMO systems may be described by taking a vector for $\underline{x}$ for x, a vector $\underline{y}$ for y, and a matrix H for h. In wireless channels h and H are varying in time and need to be estimated or tracked on a continuous basis.

Once the system has split the acquired data into K data streams for the K locations in the sector, the system delivers each of the data streams to the respective locations in the sector. To describe the details of this step, the main concepts are described in a time-discrete model for the communication system. Furthermore, the frequency response of the channel is assumed to be essentially flat, i.e. the response is constant as a function of frequency. This may for instance result from the use of OFDM or SC-FDE modulation. However, the main principles may be implemented with other modulation methods also.

The data stream may consist of a sequence of data blocks where each of the data blocks may become available for instance every T seconds. Each block may e.g. describe a 3D map measured by a LIDAR at a particular instance in time. The elements of the data block may be represented as bits, digits or any other convenient data representation format. Without loss of generality it is assumed that a block of data $D_i$ for the ith stream comprises S symbols that are taken from a subset of the complex numbers. Such subset is often called a signal constellation. The signal constellation may be for instance a quadrature amplitude modulation (QAM) constellation. Consider a block $D_i$ that becomes available at a particular instance in time. The principles of the solution are explained for this single block. However, the extension to blocks that become available e.g. every T seconds is straightforward. The jth symbol in the block $D_i$ is denoted by $D_{i,j}$ for j=0, . . . , S-1.

The number of antennas of the antenna array is denoted by N. For a massive MIMO array, N may be in the order of several tens to hundreds of antennas. The transfer from the antenna array to K locations in the sector may be defined by an K×N matrix H. The element of H at row i and column j is denoted by $H_{i,j}$, and denotes the transfer from the jth antenna of the array to the ith location in the sector. In an embodiment, the elements of the matrix H are complex numbers. This may be the case when for instance OFDM or SC-FDE is used as an equalization method. In another embodiment, communication may be sufficiently narrowband leading to a matrix H of complex numbers. The symbols that may be received at the K locations are denoted by a column vector y where the ith element $y_i$ denotes the symbol received at the ith location.

The system generates a column vector $\underline{x}$ of size N of which the components define the signals transmitted from each of the array elements. The vector $\underline{x}$ is generated based on K components from the K data streams. In each jth timeslot the components $D_{i,j}$ may be used for i=0, . . . , K-1. In an embodiment, the vector $\underline{x}$ is generated from the components $D_{i,j}$ by the application of a matrix P of size N×K. Let a vector $\underline{d}$ be defined by Equation 1:

$$\underline{d}=[D_{0,j} D_{1,j} \ldots D_{K-1,j}]^T \quad \text{(Equation 1)}$$

where T denotes the vector transpose. The vector $\underline{x}$ may be generated as $\underline{x}=P\underline{d}$.

In an embodiment, the matrix P is chosen as the Moore-Penrose pseudo-inverse of the channel matrix H. In this case, the symbols $y_i$ received at the locations in the sector are equal to the symbols $D_{i,j}$ for i=0, . . . , K-1. Thereby achieving the goal of transmitting the data relevant to a location to that particular location. Other options for choosing the matrix P are also possible. For instance, properties of noise may be taken into account, which may lead to a choice of P that corresponds to for instance the minimum mean square error (MMSE) solution. Both the solution based on the Moore-Penrose pseudo-inverse (zero-forcing solution) and the MMSE solution are linear filters. Other classes of linear filters may be used also where the computation of the filter matrix includes other constraints. For instance a minimum mean square-error solution may be formulated jointly for MIMO processing and equalization. Furthermore, adaptive filter strategies based on Kalman filtering, recursive linear square (RLS) filters may be used also.

For this to work, the rank of the channel matrix H needs to be equal to the number of location dependent data streams (K). To achieve this, the number of antenna array elements N has to be at least K. In an embodiment, N may be several times larger than K by choosing, for instance, K small enough. For reasonable K in the order of 10-50 per base station this is achievable with a massive MIMO array.

Figure 7:
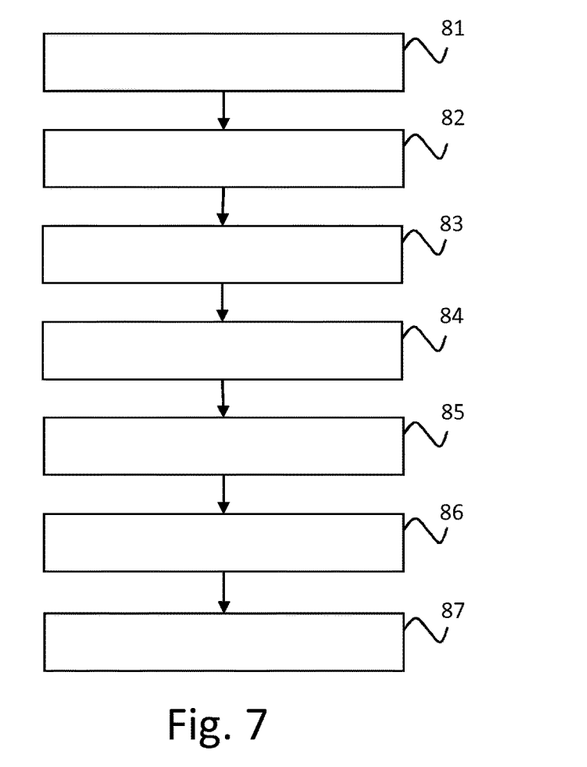
FIG. 7 is a flow diagram of an embodiment of the method of transmitting location dependent data.

An embodiment of the method of transmitting location dependent data is shown in FIG. 7. In step 81, data is acquired that is relevant for each geographical region of interest of a sector. In step 82, K locations are selected in the sector, each location being located in a different geographical region. In step 83, the data acquired in step 81 is split into K blocks $D_i$ where each of the blocks comprises data that is relevant for one of the K locations in the sector. In step 84, each of the blocks $D_i$ is mapped into K blocks $M_i$ of modulated data. This may be performed by mapping the bits in a block $D_i$ to elements of a signal constellation. Signal constellations that may be used are for instance QAM, PAM, and phase-shift keying (PSK) signal constellations. The length of the modulated data blocks $D_i$ may be less than the length of the original blocks $D_i$ when for instance non-binary signal constellations are used. Additionally, the mapping operation may also include other processes used in communication systems such as encoding of error-correcting codes.

In step 85, a vector $\underline{d}$ is generated from the elements of the modulated data blocks $M_i$. Such vector $\underline{d}$ may be generated every symbol interval $T_s$ and for the jth symbol interval the vector $\underline{d}$ may be generated as $\underline{d}=[M_{0,j} M_{1,j} \ldots M_{K-1,j}]^T$ where T denotes the vector transpose. The symbol interval may correspond to the baud rate at which the system transmits symbols. In step 86, a matrix P is applied to the vector $\underline{d}$ to generate a vector $\underline{x}$. In an embodiment, the matrix P is chosen as the Moore-Penrose pseudo inverse of the channel matrix H.

In step 87, the ith element $x_i$ of the vector $\underline{x}$ is transmitted from the ith element of the antenna array for i=0, ..., N−1. With such processing, the jth element of $\underline{d}$ will be delivered to the jth location in the sector for j=0, ..., K−1. The reason for this is that H times P equals the identity matrix in the case the rank of H is at least K. The latter may be achieved by using a sufficiently large number of antenna array elements relative to K.

Figure 4:
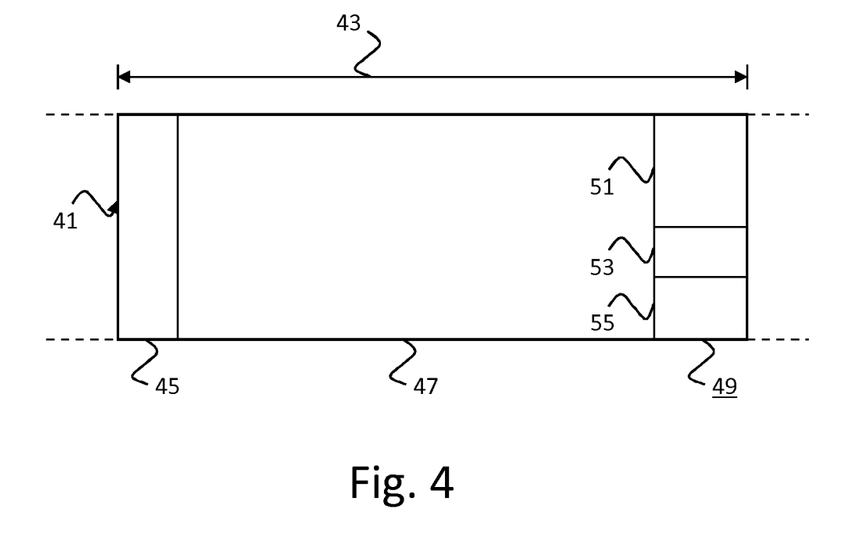
FIG. 4 shows an embodiment of the computer-implemented data format of the invention.

The computer-implemented data format of the invention comprises a location dependent part 47 and an identifier 45, see FIG. 4. The identifier 45 comprises at least one of an identifier of the location dependent part and an identifier of a reference location associated with the location dependent part. The identifier of the reference location is used to determine a target location to which the location dependent part is transmitted. The data format may further comprise an uplink pilot 51. Processing is performed based on a channel matrix H. This channel matrix has to be known to some level of precision. In MIMO systems the downlink channel matrix is estimated with help of training sequences. In an embodiment of the invention, each data stream is sent to a reference location without any stationary receiver being present at this location and any user that happens to be at this location may receive the data stream for this location. Hence there is no fixed connection to a user or uplink on which to send the result of the estimated channel back in this case. There are several ways to resolve this. The uplink pilot 51 is a first option.

FIG. 4 shows a frame format with which the data streams may be sent to the locations in the sector. The length of the data frame 41 is $T_F$, denoted by 43, where $T_F$ is smaller than the coherence time of the channel. Hence within a frame 41 the channel does not vary in time. Furthermore, it is assumed that at the beginning of the frame, the base station has full channel knowledge (e.g. the matrix H is known). This may be achieved by an initial training phase when devices are switched on.

The frame 41 consists of two main parts. The first part comprises the identifier 45 and the actual location dependent data 47. The identifier 47 may comprise a stream number defined by the system and/or the geographical (e.g. GPS) coordinates of the location for which the stream is meant, for example. The system transmits the first part of the frame 41. A user or device that receives the first part of the frame may respond during the second part 49 of the frame 41. In this second part 49, an uplink pilot 51 is transmitted together with an ID 55 and optionally geographical (e.g. GPS) coordinates 53 of the device. In an embodiment, the ID 55 transmitted by the device is equal to the identifier 47 received by the device in the first part of the frame 41. The first and second parts of the frame 41 are transmitted in the same frequency band.

After transmitting the first part of the frame 41, the system may receive the second part 49 of the frame 41 from one of the devices. Many devices in the sector may respond at the same time. Since the uplink channel and downlink channel are the same (channel reciprocity), the system can separate the different uplink pilots 51 sent by the devices in the sector by using an MIMO array. From the uplink pilots 51 embedded in the second part of the frame 41, the channel may be re-estimated, and the current channel state may be updated with this estimate. The devices may also send their geographical, e.g. GPS, coordinates 53 back, and by using these an accurate map of the channel conditions in the sector may be created.

A variety of methods known to those of skill in the art may be used to estimate the channel matrix H. In its basic form a device of a user may transmit a pilot symbol s that is taken from a signal constellation. The signal constellation may be a two-dimensional signal constellation such as a QPSK, QAM16, or QAM64 signal constellation. In such case s can be interpreted as a complex number. Furthermore, the value of s is predefined and assumed to be known at the base station. In case a user device transmits s, the base station may use the received response at each of the antennas of the array to estimate part of the channel matrix H corresponding to the user that transmitted s. For instance when the received response is denoted by $y_0, \ldots, y_{M-1}$ for each of the antennas, the channel coefficient $h_i$ for antenna i may be estimated as $h_i = y_i/s$. The set of elements define the transfer from the user device to the antenna array and form a row of the channel matrix H. Instead of using a single pilot, multiple pilot symbols may be used to increase the precision. Furthermore, instead of simply dividing the received value by the pilot symbol, more elaborate methods that also take noise into account may be used. For instance when the characteristics of the noise at the receivers of the array are known, an MMSE solution may be used to estimate $h_i$.

With the abovementioned method, a single row of the channel matrix corresponding to a single location may be estimated. To estimate all rows, all user devices that are at particular locations may transmit pilot symbols. These users may transmit the pilot symbols at different instances in time such that the base station can separate contributions from the different users. In a setting where the base station already has an estimate of the channel matrix and the goal is to further improve on this estimate, the base station may also use MIMO techniques to separate the user contributions. This allows users to send pilots at the same time. Yet another option is that each of the users transmits a time-domain pilot sequence where the sequence are orthogonal such that the base station may separate the contributions from the different users.

Figure 8:
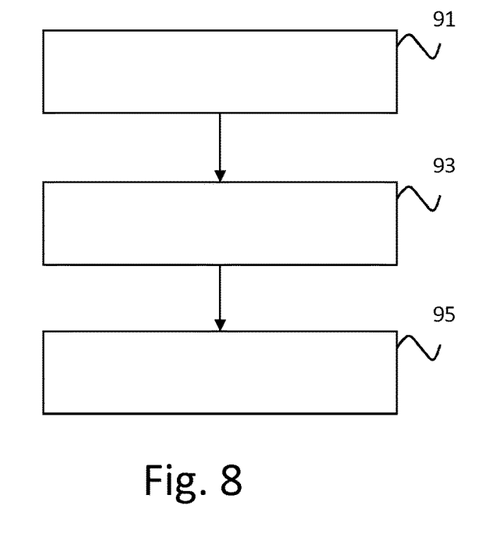
FIG. 8 is a flow diagram of the method of receiving location dependent data of the invention.

The method of receiving location dependent data of the invention comprises three steps, see FIG. 8. A step 91 comprises using a receiver to receive a broadcast data stream comprising a first location dependent part of the location dependent data and a first identifier identifying the first location dependent part at a previous instance and a second location dependent part of the location dependent data and a second identifier identifying the second location dependent part at a current instance. This broadcast stream preferably uses the data format shown in FIG. 4. A step 93 comprises detecting a difference between the first identifier and the second identifier. A step 95 comprises disregarding the first location dependent part when the difference is detected.

Figure 9:
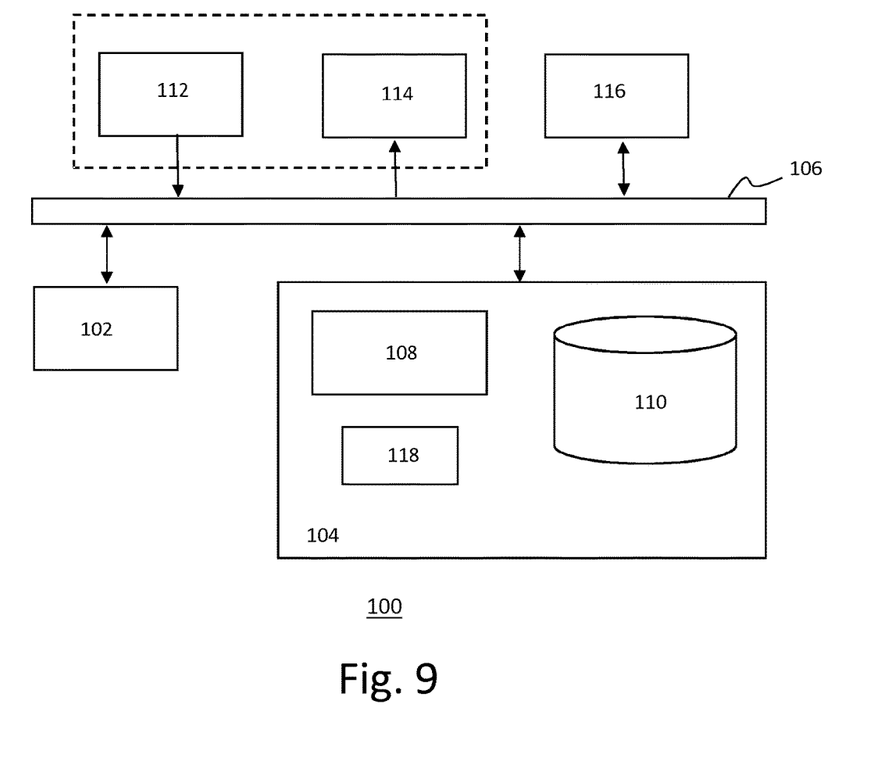
FIG. 9 is a block diagram of an exemplary data processing system for performing the methods of the invention.

FIG. 9 depicts a block diagram illustrating an exemplary data processing system that may perform the methods as described with reference to FIGS. 6 to 8.

As shown in FIG. 9, the data processing system 100 may include at least one processor 102 coupled to memory elements 104 through a system bus 106. As such, the data processing system may store program code within memory elements 104. Further, the processor 102 may execute the program code accessed from the memory elements 104 via a system bus 106. In one aspect, the data processing system may be implemented as a computer that is suitable for storing and/or executing program code. It should be appreciated, however, that the data processing system 100 may be implemented in the form of any system including a processor and a memory that is capable of performing the functions described within this specification. The data processing system 100 may further comprise the transmitter and the plurality of antennas of the system of the invention, for example. Alternatively, the system 1 of FIG. 1 may comprise the data processing system 100 of FIG. 9, for example. The data processing system 100 may further comprise the receiver of the device of the invention, for example. Alternatively, the device 17 of FIG. 3 may comprise the data processing system 100 of FIG. 9, for example The memory elements 104 may include one or more physical memory devices such as, for example, local memory 108 and one or more bulk storage devices 110. The local memory may refer to random access memory or other non-persistent memory device(s) generally used during actual execution of the program code. A bulk storage device may be implemented as a hard drive or other persistent data storage device. The processing system 100 may also include one or more cache memories (not shown) that provide temporary storage of at least some program code in order to reduce the number of times program code must be retrieved from the bulk storage device 110 during execution.

Input/output (I/O) devices depicted as an input device 112 and an output device 114 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 9 with a dashed line surrounding the input device 112 and the output device 114). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 116 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 100, and a data transmitter for transmitting data from the data processing system 100 to said systems, devices and/or networks. Modems, cable modems, and Ethernet cards are examples of different types of network adapter that may be used with the data processing system 100.

As pictured in FIG. 9, the memory elements 104 may store an application 118. In various embodiments, the application 118 may be stored in the local memory 108, the one or more bulk storage devices 110, or separate from the local memory and the bulk storage devices. It should be appreciated that the data processing system 100 may further execute an operating system (not shown in FIG. 9) that can facilitate execution of the application 118. The application 118, being implemented in the form of executable program code, can be executed by the data processing system 100, e.g., by the processor 102. Responsive to executing the application, the data processing system 100 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 102 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for transmitting location dependent data, comprising:
    an antenna array;
    a transmitter coupled the antenna array; and
    a processor configured to determine a plurality of location dependent parts of the location dependent data, each of the plurality of location dependent parts corresponding to a different geographical region, and to use the transmitter to transmit each of at least two of the plurality of location dependent parts to a different target location over the antenna array using beamforming, wherein each of the at least two of the plurality of location dependent parts is associated with a different reference location and the distance between a target location and a reference location associated with a location dependent part transmitted to the target location is smaller than a predetermined threshold.

2. The system of claim 1, wherein the processor is further configured to use the transmitter to transmit the each of the at least two of the plurality of location dependent parts to the different target location over the antenna array using multipath propagation.

3. The system of claim 1, wherein the processor is further configured to use the transmitter to transmit the plurality of location dependent parts to stationary receivers at the reference locations.

4. The system of claim 1, wherein the processor is further configured to configure a directivity of at least one of the transmitter or the antenna array based on the reference location associated with the location dependent part and a location of a receiver located near the reference location in order to transmit the location dependent part to the target location.

5. The system of claim 1, wherein the antenna array comprises N antennas, the plurality of location dependent parts comprises K location dependent parts, the target locations comprise K target locations and N is at least equal to K.

6. The system of claim 5, wherein N is larger than K.

7. The system of claim 5, wherein signals transmitted over the N antennas can be represented by a vector $\vec{x}$, signals received at the K target locations can be represented by a vector $\vec{y}$, the vector $\vec{y}$ can be approximated by multiplying a K×N channel matrix H with the vector $\vec{x}$ and the K×N channel matrix H has a rank of K.

8. The system of claim 7, wherein at least one of the processor or the transmitter is configured to generate values for transmission over the N antennas which can be represented by the vector $\vec{x}$ by performing at least one multiplication that is equal to multiplying a column vector comprising the K location dependent parts with a N×K matrix P, the K×N channel matrix H multiplied with the N×K matrix P equaling the identity matrix.

9. The system of claim 1, further comprising data storage configured to store the plurality of location dependent parts and information associating each of the plurality of location dependent parts with a different reference location, wherein the processor is further configured to determine a target location for each of the location dependent parts based on the reference location associated with the each of the location dependent parts and configured to obtain the plurality of location dependent parts from the data storage.

10. The system of claim 1, wherein the processor is further configured to use the transmitter to transmit at least one of an identifier of the location dependent part and an identifier of the reference location associated with the location dependent part along with the location dependent part to the target location.

11. A device for receiving location dependent data, the device comprising:
a receiver; and
a processor configured to use the receiver to receive a broadcast data stream comprising a first location dependent part of the location dependent data and a first identifier identifying the first location dependent part at a previous instance and a second location dependent part of the location dependent data and a second identifier identifying the second location dependent part at a current instance, to detect a difference between the first identifier and the second identifier and to disregard the first location dependent part when the difference is detected.

12. The device of claim 11, wherein the processor is further configured to determine a geographical location of the device, to use the receiver to receive an identifier of a location associated with the second location dependent part in the broadcast data stream and to correct the second location dependent part based on a difference between the determined geographical location of the device and the location associated with the second location dependent part.

13. A method of transmitting location dependent data, comprising:
determining a plurality of location dependent parts of the location dependent data, each of the plurality of location dependent parts corresponding to a different geographical region; and
using a transmitter to transmit each of at least two of the plurality of location dependent parts to a different target location over an antenna array using beamforming, wherein each of the at least two of the plurality of location dependent parts is associated with a different reference location and the distance between a target location and a reference location associated with a location dependent part transmitted to the target location is smaller than a predetermined threshold.

14. The method of claim 13, wherein using the transmitter to transmit the each of the at least two of the plurality of location dependent parts to the different target location over the antenna array comprises using the transmitter to transmit the each of the at least two of the plurality of location dependent parts to a different target location over the antenna array using multipath propagation.

15. A method of receiving location dependent data, comprising:
using a receiver to receive a broadcast data stream comprising a first location dependent part of the location dependent data and a first identifier identifying the first location dependent part at a previous instance and a second location dependent part of the location dependent data and a second identifier identifying the second location dependent part at a current instance;
detecting a difference between the first identifier and the second identifier; and
disregarding the first location dependent part when the difference is detected.

16. A non-transitory computer-readable medium having instructions stored thereon that, when executed by a processor of a system comprising an antenna array and a transmitter coupled to the antenna array, cause the processor to carry out operations including:
determining a plurality of location dependent parts of the location dependent data, each of the plurality of location dependent parts corresponding to a different geographical region; and
using the transmitter to transmit each of at least two of the plurality of location dependent parts to a different target location over the antenna array using beamforming, wherein each of the at least two of the plurality of location dependent parts is associated with a different reference location and the distance between a target location and a reference location associated with a location dependent part transmitted to the target location is smaller than a predetermined threshold.

17. A non-transitory computer-readable medium having instructions stored thereon that, when executed by a processor of a system comprising a receiver, cause the processor to carry out operations including:
using the receiver to receive a broadcast data stream comprising a first location dependent part of the location dependent data and a first identifier identifying the first location dependent part at a previous instance and a second location dependent part of the location dependent data and a second identifier identifying the second location dependent part at a current instance;

detecting a difference between the first identifier and the second identifier; and disregarding the first location dependent part when the difference is detected.

* * * * *